(12) United States Patent
Boehmer et al.

(10) Patent No.: US 7,642,207 B2
(45) Date of Patent: Jan. 5, 2010

(54) UNITARY ABSORBENT MULTILAYERED CORE

(75) Inventors: Brian E. Boehmer, Bartlett, TN (US); Jeffrey Scott Hurley, Bartlett, TN (US); Kathy L. Chamness, Memphis, TN (US); Joshua D. Crews, Arlington, TN (US); John H. Roberts, Memphis, TN (US)

(73) Assignee: Buckeye Technologies Inc., Memphis, TN (US)

( * ) Notice: Subject to any disclaimer, the term of this patent is extended or adjusted under 35 U.S.C. 154(b) by 113 days.

(21) Appl. No.: 10/495,441

(22) PCT Filed: Nov. 8, 2002

(86) PCT No.: PCT/US02/35965

§ 371 (c)(1),
(2), (4) Date: May 10, 2004

(87) PCT Pub. No.: WO03/039852

PCT Pub. Date: May 15, 2003

(65) Prior Publication Data

US 2005/0004541 A1     Jan. 6, 2005

Related U.S. Application Data

(60) Provisional application No. 60/345,049, filed on Nov. 9, 2001.

(51) Int. Cl.
*B32B 5/26* (2006.01)
*D04H 1/00* (2006.01)
*B32B 7/02* (2006.01)

(52) U.S. Cl. .................. 442/382; 442/414; 428/219

(58) Field of Classification Search .................. 428/138, 428/219; 442/414, 382
See application file for complete search history.

(56) References Cited

U.S. PATENT DOCUMENTS

| | | | |
|---|---|---|---|
| 2,929,154 A | 3/1960 | Finnegan |
| 3,224,986 A | 12/1965 | Butler et al. |
| 3,332,909 A | 7/1967 | Farnham et al. |
| 3,575,287 A | 4/1971 | Graveley |
| 4,076,673 A | 2/1978 | Burkholder, Jr. |
| 4,102,340 A | 7/1978 | Mesek et al. |
| 4,275,811 A | 6/1981 | Miller |
| 4,321,997 A | 3/1982 | Miller |

(Continued)

FOREIGN PATENT DOCUMENTS

EP     0 852 268 A1     7/1998

(Continued)

*Primary Examiner*—Norca L Torres-Velazquez
(74) *Attorney, Agent, or Firm*—Baker Botts L.L.P.

(57) ABSTRACT

The present invention is directed to a unitary absorbent core including a first fibrous absorbent layer of (a) natural fibers, synthetic fibers or a mixture thereof, (b) a binder which is a synthetic binder fiber or powder, a hydrophilic emulsion polymer binder or a mixture thereof, the fibrous absorbent layer having an upper surface and a lower surface, the lower surface in contact, optionally coextensively in contact, with an upper surface of a synthetic carrier which has a lower surface integral with a first hydrophobic vapor-transmissive moisture barrier. The present invention is also directed to a receptacle for food incorporating the unitary absorbent core. The present invention is also directed to a filter element incorporating the unitary absorbent core.

21 Claims, 3 Drawing Sheets

U.S. PATENT DOCUMENTS

| | | | |
|---|---|---|---|
| 4,410,578 | A | 10/1983 | Miller |
| RE32,649 | E | 4/1988 | Brandt et al. |
| 4,847,148 | A * | 7/1989 | Schirmer .................... 428/332 |
| 4,865,855 | A | 9/1989 | Hansen et al. |
| 4,929,480 | A | 5/1990 | Midkiff et al. |
| 4,949,897 | A | 8/1990 | Pawlak et al. |
| 5,135,521 | A * | 8/1992 | Luceri et al. ................ 604/383 |
| 5,147,343 | A | 9/1992 | Kellenberger |
| 5,378,528 | A | 1/1995 | Makoui |
| 5,795,439 | A | 8/1998 | Euripides et al. |
| 5,807,916 | A | 9/1998 | Collette et al. |
| 5,849,211 | A | 12/1998 | Hase et al. |
| 2002/0013560 | A1 * | 1/2002 | Erspamer et al. ............ 604/381 |

FOREIGN PATENT DOCUMENTS

| | | |
|---|---|---|
| WO | WO 99/16961 | 4/1999 |
| WO | WO 99/32286 | 7/1999 |
| WO | WO 99/63922 | 12/1999 |
| WO | WO 99/63923 | 12/1999 |
| WO | WO 99/63925 | 12/1999 |
| WO | WO00/13637 | 3/2000 |
| WO | WO 00/38607 A1 | 7/2000 |
| WO | WO-00/41882 A1 | 7/2000 |
| WO | WO 00/74620 | 12/2000 |

* cited by examiner

Graph of Hydrostatic Head versus Meltblown
Content of Barrier-Coated SMS Carriers

UNITARY ABSORBENT MULTILAYERED CORE

This application claims the benefit of U.S. Provisional Application Ser. No. 60/345,049, filed Nov. 9, 2001, which is hereby incorporated by reference in its entirety.

FIELD OF THE INVENTION

The present invention is directed to an absorbent core for use with packaging and displaying poultry, fish, meat, and other foods which tend to exude fluids after packaging. More particularly, the invention is directed to an absorbent core including an absorbent stratum or strata integral with a moisture barrier.

BACKGROUND OF THE INVENTION

Conventionally, foods such as fresh poultry, fish, meat, and other foods which tend to exude fluids after packaging, are packaged for refrigerated display by employing a tray to receive the food. Generally, a transparent or translucent plastic film is wrapped and sealed around the food placed on the tray itself and the tray to provide a finished, sealed package. The tray provides structural integrity and acts as a reservoir for fluids. Ideally, the tray also serves as a moisture barrier.

One type of tray is generally constructed from compressed wood pulp. However, the structural integrity of this type of tray is diminished by the absorption of fluids from the product placed on the tray. Another type of tray is made from a non-absorbent material which can retain its structural integrity upon exposure to fluids and moisture. Suitable non-absorbent materials include thermoplastic materials, such as polyethylene, polypropylene, polystyrene, and polyvinyl chloride. Although trays made from thermoplastic materials as described above have several advantages in terms of cost, weight, aesthetics, durability, and other characteristics, the inability of these materials to absorb moisture often results in the accumulation of fluid exuded from the food product placed on the tray. The tray with the food product is customarily wrapped and optionally heat sealed with a transparent, flexible thermoplastic film so that the finished product may be displayed in a refrigerated display case in such a manner that the consumer may view the food product directly through the packaging. Accordingly, the accumulation of fluids in the tray surrounding the food product is undesirable because it results in an unsightly, unappetizing and therefore unappealing packaged product. Furthermore, and more importantly, although the package is sealed with a flexible transparent film the accumulated fluid may leak from the package. In addition, accumulated fluids may promote the growth of bacteria.

One approach to solving this problem has been to provide an absorbent pad between the upper surface of the non-absorbent tray and the food product. In theory, the pad will absorb the exuded fluids from the food product preventing the accumulation of free fluids within the package. Another proposed solution to the problem has been to provide a separate reservoir within the tray such that fluids exuded by the food product are drained away from contact with the product, generally by providing a retaining surface above the bottom wall of the tray. The retaining surface includes drain holes extending therethrough such that fluid drains from the product retaining surface and is retained above the lower wall of the tray. Examples of food trays and pads for use therewith are shown in U.S. Pat. Nos. 3,575,287, 4,275,811, 4,321,997, 4,410,578, 4,865,855, 4,929,480, 4,949,897 and WO 99/32286. The disclosure of each of the foregoing U.S. patents is hereby incorporated by reference.

The use of prior absorbent pads for the absorption of fluids from a packaged food product suffers from several disadvantages. Typically, after the pad is saturated with fluid it tends to stick to the food product and must be physically separated from the food product by the consumer after the package is opened. Because the pad is saturated with fluids exuded by the food product, this is a generally unappealing exercise.

The use of a separate fluid reservoir to separate and retain exuded fluids, suffers from other disadvantages. The construction of the food tray is complex, requiring at least two layers separated by a free space to serve as the reservoir. Further, it is difficult to keep the fluid within the reservoir when the package is upset from a level orientation. Thus, it is an object of the present invention to provide an absorbent core for use with food packaging and which is capable of absorbing all or substantially all of the fluid which may be exuded from a food product placed within the tray during its shelf life. It is another object of the present invention to provide an absorbent core which may be used in a food package to maintain an aesthetically pleasing and sanitary package. It is yet another object of the present invention to provide an absorbent core which upon absorbing fluid from the food product prevents or at least minimizes rewet, or fluid contact between the fluid and the food product.

SUMMARY OF THE INVENTION

The present invention is directed to a unitary absorbent core including a first fibrous absorbent layer of (a) natural fibers, synthetic fibers or a mixture thereof, (b) a binder which is a synthetic binder fiber or powder, a hydrophilic emulsion polymer binder or a mixture thereof, the fibrous absorbent layer having an upper surface and a lower surface, the lower surface in contact, optionally coextensively in contact, with an upper surface of a synthetic carrier which has a lower surface integral with a first hydrophobic vapor-transmissive moisture barrier. The present invention is also directed to a receptacle for food incorporating the unitary absorbent core. The present invention is also directed to a filter element incorporating the unitary absorbent core.

DETAILED DESCRIPTION OF THE INVENTION

Figure 3:
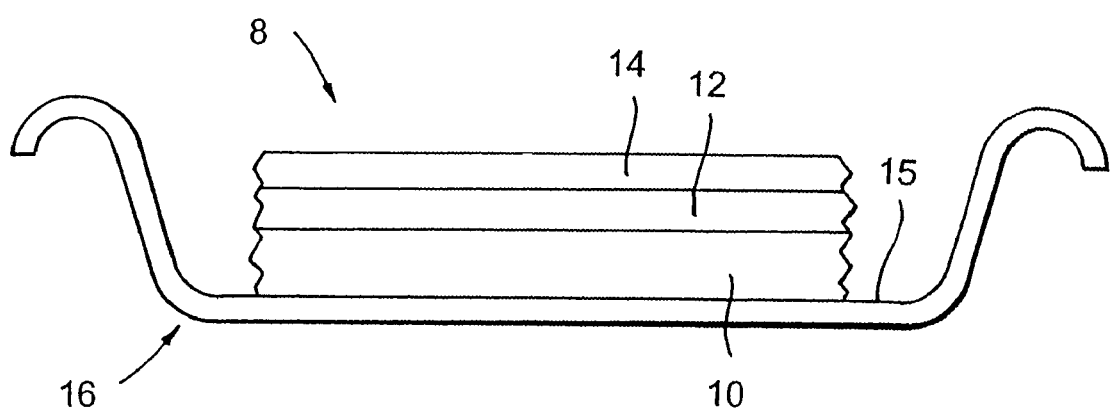
FIG. 3 is a cross-sectional view of a food tray (16) including an absorbent core (8) of the present invention. The absorbent core (8) rests upon the upper surface (15) of the tray (16). The absorbent core (8) of the present invention includes a fibrous, absorbent layer (10) having an upper fluid receiving surface and a lower surface, and a vapor-transmissive moisture barrier integral with the lower surface of the absorbent layer; a second fibrous absorbent layer (12); and a third absorbent layer (14).

The present invention is directed to an absorbent core which may be used with food packaging to absorb and retain fluid exuded by a food product, while minimizing rewet of the food product by the fluid absorbed by the core. With reference to FIG. 3, food tray 8 may be made from any suitable thermoplastic material such as polyethylene, polypropylene, polystyrene, or polyvinyl chloride cellular materials. The tray is preferably made from polystyrene foam obtained from either expanded polystyrene or sheet molding.

Absorbent core 8 rests upon the upper surface 15 of tray 16. Core 8 may be constructed from a variety of materials as set forth in detail below.

The outer surfaces of absorbent core 8 may optionally be compatible with layer 15 such that the core and the layer may be laminated. If desired, the lamination surface of either layer 15 or core 8 may be treated to enhance lamination, by for example flame treatment or corona discharge treatment. In this embodiment, core 8 is laminated to all or a portion of the surface of layer 15. Alternatively, core 8 may be cut to desired size and simply placed within tray 16 such that the food product will rest upon the core. Optionally, the cut-out core 8 may be glued or otherwise adhered to the upper surface of layer 15 to hold the core in place within the tray. Acceptable adhesives may be any adhesive compatible with the two layers, and acceptable for use in a food packaging environment. Examples of such adhesives include ethylene vinyl acetate (EVA); acrylics, urethanes, polyamides, polyesters, polyamides, etc. An example of a suitable EVA adhesive is Airflex 460, available from Air Products. All U.S. patents cited herein are hereby incorporated by reference. In the case of a conflict in terminology, the present disclosure controls.

The unitary absorbent core of the present invention includes a fibrous, absorbent layer having an upper fluid receiving surface and a lower surface, and a vapor-transmissive moisture barrier integral with the lower surface of the absorbent layer. Many of the materials useful in the practice of this invention are described in U.S. Patent Application Publication No. 2002-0013560-A1, which is hereby incorporated by reference in its entirety.

The fibrous absorbent core may be formed using materials and techniques well known in the art. For example, the core may include one or more layers or strata of natural or synthetic fibers, hereinafter referred to as an "absorbent layer." Cellulosic fibers are preferred for use in the absorbent layer. The absorbent layer may be formed using wetlaid or airlaid techniques, although airlaid processes are preferred. Binders, such as, for example, wet strength agents, latex emulsions, thermoplastic bicomponent fibers ("bico"), thermoplastic bonding powders, including polefins and polyesters, and combinations thereof, may be incorporated into the absorbent layer. The term "multibonded" is used to describe an absorbent layer incorporating a combination of binders including a preferred combination of latex and bico. Small amounts of a water-based hydrophilic emulsion binder may be applied to the surfaces of the absorbent layer to reduce "dust-off" of loose fibers and other particles. Further, for improved absorption of fluids, superabsorbent polymers (SAP) may be incorporated into the absorbent layer. SAP may be incorporated into the absorbent layer as particles, granules, flakes, fibers (SAF), etc., and may be included as a discrete stratum or mixed with the fibers of .the absorbent layer. Materials such as fillers, perfumes, surfactants, and additives may be included in the core. Desirable absorbent cores suitable for use in the practice of this invention and components suitable for use in the cores are described in WO 99/16961, WO 99/63922, WO 99/63923, WO 99/63925, WO 00/41882, WO 00/38607, all of which are hereby incorporated by reference.

In a preferred embodiment, the unitary absorbent core of this invention can be described as a multi-zone or multi-strata or multilayer absorbent structure, which has two or more distinct strata. As used herein, the terms "stratum" and "strata" refer to the layered regions which make up the unitary structure. The unitary structure is constructed by assembling the strata in a continuous manner in a series of unit operations which results in the production of the unitary absorbent core. The strata of the unitary structure is not an assembly or laminate of preformed layers or plies which are assembled on a converting line. Notwithstanding the previous statement, in an optional variation of a preferred embodiment related to the continuous airlaid process of this invention, a carrier tissue or a synthetic carrier of low basis weight or a separate stratum may be used to facilitate the production of a fibrous absorbent layer having a plurality of strata. In one embodiment, a preferred unitary absorbent core of this invention has two or more strata, at least one of which is a fibrous absorbent layer having an upper fluid receiving surface and a lower surface, and a vapor-transmissive moisture barrier integral with the lower surface of the absorbent layer. In a preferred embodiment, the unitary absorbent core is produced in a continuous manner using airlaid technology, where an individual forming head provides material for a single stratum and constitutes one unit operation in the series. Other unit operations in the series include application of a froth, foam, dry powder, or spray which produces the vapor-transmissive or nontransmissive moisture barrier, and may include compression and calendering and drying operations. The moisture barrier may be applied at any stage of the manufacture of the unitary absorbent core, e.g. after all the strata have been formed, or after any one or more strata have been formed.

Generally herein, the term "froth" is used to describe foam that is of low viscosity and of poor stability, which is easily collapsible after application to the lower surface of the fibrous absorbent layer to form a hydrophobic vapor-transmissive moisture barrier integral with the lower surface of the absorbent layer wherein the moisture barrier has a structure which substantially includes fibers coated with hydrophobic material. The terms "stand-up foam" and "stand-up foam barrier" are used to describe a more substantial foam, which, after application to the lower surface of a fibrous absorbent layer to form a hydrophobic vapor-transmissive moisture barrier integral with the lower surface of the absorbent layer, results in some coating of fibers, but also wherein the moisture barrier has a reticulated remnant of a barrier material emulsion extending from the lower surface region of the absorbent layer to form an outer reticulated foam barrier.

The unitary absorbent core of this invention has a basis weight of about 75 gsm (grams per square meter) or greater, generally from about 80 to about 1000 gsm, and preferably from about 100 gsm to about 500 gsm, and more preferably from about 125 gsm to about 350 gsm.

In another embodiment, a breathable, partially fibrous or nonfibrous nonwoven material or structure including one or more spunbonded, meltblown, conformed, bonded carded, or foamed constituents has a basis weight of about 45 gsm or greater for the entire material or structure.

The unitary absorbent core of this invention has a density of from about 0.03 g/cc to about 0.7 g/cc, preferably from about 0.04 g/cc to about 0.3 g/cc.

The structures of this invention can include natural fibers, synthetic fibers or mixtures of both natural and synthetic fibers. Examples of the types of natural fibers which can be used in the present invention include fluffed cellulose fibers prepared from cotton, softwood and/or hardwood pulps, straw, keaf fibers, cellulose fibers modified by chemical, mechanical and/or thermal treatments, keratin fibers such as fibers obtained from feathers, bagasse, hemp, and flax, as well as man-made staple fibers made with natural polymers such as cellulose, chitin, and keratin. Cellulosic fibers include chemically modified cellulose such as chemically stiffened cellulosic fibers by crosslinking agents, fibers treated with mercerizing agents and cellulose acetate. Examples of suitable synthetic matrix fibers include polyethylene, polypropylene, polyester, including polyester terephthalate (PET), polyamide, polyacetates, cellulose acetate and rayon fibers. Certain hydrophobic synthetic fibers, such as polyolefins, may be surface treated with surfactant to improve wettability, or may be used untreated, depending upon their intended function within the core.

Examples of binders which may be useful in the absorbent structure of the present invention include polymeric binders in a solid or liquid form. The term "polymeric binder" refers to any compound capable of creating interfiber bonds between matrix fibers to increase the integrity of the stratum. At the same time, the binder may optionally bind fibers and SAP particles or SAF to each other.

For example, a dispersion of natural or synthetic elastomeric latex may be used as a binder. Thermoplastic fibers or powder, which are well known in the art, are also commonly used to provide bonding upon heating of the absorbent structure to the melting point of the thermoplastic fiber or powder. Other binders, which can be used for stabilizing the absorbent structure of the present invention, include bonding agents used to bond cellulose fibers. These agents include polymers dispersed in water, which are cured after application to the fibrous web and create bonds between fibers or between fibers and SAP particles or SAF. Examples of such agents include various cationic starch derivatives and synthetic cationic polymers containing crosslinkable functional groups such as polyamide-polyamine epichlorohydrin adducts, cationic starch, dialdehyde starch and the like. Any combination of the above-described polymeric binders may be used for stabilizing the structure of the present invention. Binders useful in the structures of the invention include binders in liquid form or having a liquid carrier, including latex binders. Useful latex binders include vinyl acetate and acrylic ester copolymers, ethylene vinyl acetate copolymers, for example, Air Products AIRFLEX EP 1188, styrene butadiene carboxylate copolymers, and polyacrylonitriles, and sold, for example, under the trade names of Airbond, Airflex and Vinac of Air Products, Inc., Hycar and Geon of Goodrich Chemical Co., and Fulatex of H. B. Fuller Company. Alternatively, the binder may be a non-latex binder, such as epichlorohydrin and the like.

For bonding the fibers specifically, and for structural integrity of the unitary absorbent core generally, water-based latex binders may be used. Alternatively, or in combination with a latex binder, thermoplastic binding material (fibers or powders) may be used for bonding upon heating to the melting point of the thermoplastic binding material. Suitable thermoplastic binding material includes thermoplastic fibers, such as bicomponent thermoplastic fibers ("bico"). Preferred thermoplastic binding fibers provide enhanced adhesion for a wide range of materials, including synthetic and natural fibers, particles, and synthetic and natural carrier sheets. An exemplary thermoplastic bico fiber is Celbond Type 255 Bico fiber from KoSa. Other suitable thermoplastic fibers include polypropylenes, polyesters, nylons and other olefins, or modifications thereof. A preferred thermoplastic fiber is FiberVisions type AL-Adhesion-C Bicomponent Fiber, which contains a polypropylene core and an activated copolyolefin sheath.

Functional particles for use in the absorbent cores of the invention include particles, flakes, powders, granules or the like which serve as absorbents, odor control agents, such as, for example, zeolites or calcium carbonates, bicarbonates, especially sodium bicarbonate, fragrances, antimicrobial agents and the like. The particles may include any functional powder or other particle having a particle diameter up to 3,000 μ (microns). In some preferred embodiments, the functional particles used in the core include super absorbent polymer particles ("SAP"). In one desirable embodiment of this invention, the unitary absorbent core contains from about 5 to about 90 percent by weight of SAP, preferably from about 10 to about 80 percent by weight of SAP, more preferably from about 10 to about 50 percent by weight of SAP.

U.S. Pat. Nos. 5,147,343; 5,378,528; 5,795,439; 5,807,916; and 5,849,211, which describe various superabsorbent polymers and methods of manufacture, are hereby incorporated by reference. Examples of the types of SAP particles which may be used in this invention, include superabsorbent polymers in their particulate form such as irregular granules, spherical particles, staple fibers and other elongated particles. The term "superabsorbent polymer" or "SAP" refers to a normally water-soluble polymer, which has been crosslinked. There are known methods of making water-soluble polymers such as carboxylic polyelectrolytes to create hydrogel-forming materials, now commonly referred to as superabsorbents or SAPs, and it is well known to use such materials to enhance the absorbency of disposable absorbent articles. There are also known methods of crosslinking carboxylated polyelectrolytes to obtain superabsorbent polymers. SAP particles useful in the practice of this invention are commercially available from a number of manufacturers, including Dow Chemical (Midland, Mich.), Stockhausen (Greensboro, N.C.), and Chemdal (Arlington Heights, Ill.). One conventional granular superabsorbent polymer is based on poly (acrylic acid) which has been crosslinked during polymerization with any of a number of multi-functional co-monomer crosslinking agents, as is well known in the art. Examples of multifunctional crosslinking agents are set forth in U.S. Pat. Nos. 2,929,154; 3,224,986; 3,332,909; and 4,076,673, all of which are hereby incorporated by reference. Other water-soluble polyelectrolyte polymers are known to be useful for the preparation of superabsorbents by crosslinking, these polymers include carboxymethyl starch, carboxymethyl cellulose, chitosan salts, gelatin salts, etc. They are not, however, commonly used on a commercial scale to enhance absorbency of disposable absorbent articles, primarily due to lower absorbent efficiency or higher cost.

Superabsorbent particulate polymers are also described in detail in U.S. Pat. Nos. 4,102,340 and Re 32,649, both of which are hereby incorporated by reference. Suitable SAPs yield high gel volumes or high gel strength as measured by the shear modulus of the hydrogel. Such preferred SAPs contain relatively low levels of polymeric materials that can be extracted by contact with synthetic urine (so-called "extractables"). SAPs are well known and are commercially available from several sources. One example is a starch graft polyacrylate hydrogel marketed under the name IM1000 (BASF; Portsmouth, Va.). Other commercially available SAPs are marketed under the trademark SANWET (Sanyo Kasei Kogyo; Kabushild, Japan), SUMIKA GEL (Sumitomo Kagaku Kabushiki; Haishi, Japan), FAVOR (Stockhausen; Garyville, La.) and the ASAP series (BASF; Aberdeen, Miss.). Most preferred for use with the present invention are polyacrylate-based SAPs. As used in the present invention, SAP particles of any size or shape suitable for use in an absorbent core may be employed.

Figure 4:
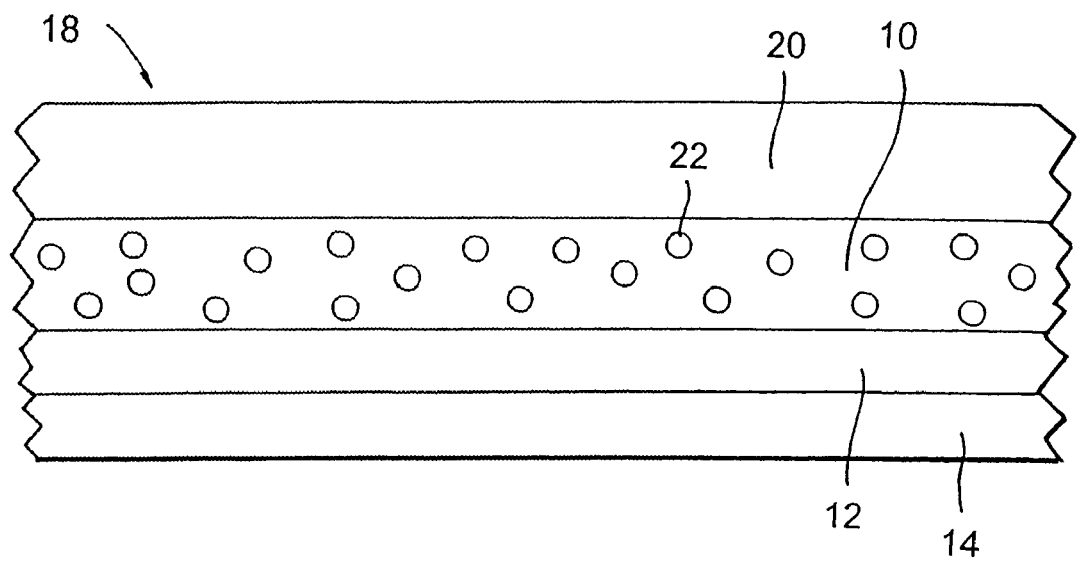
FIG. 4 is a cross-sectional view of another embodiment of the present invention. The absorbent core (18) is a multi-strata structure with 4 absorbent layers (14, 12, 10, 20). Superabsorbent polymers (SAP) (22) is incorporated into one of the absorbent layers (10).
Figure 5:
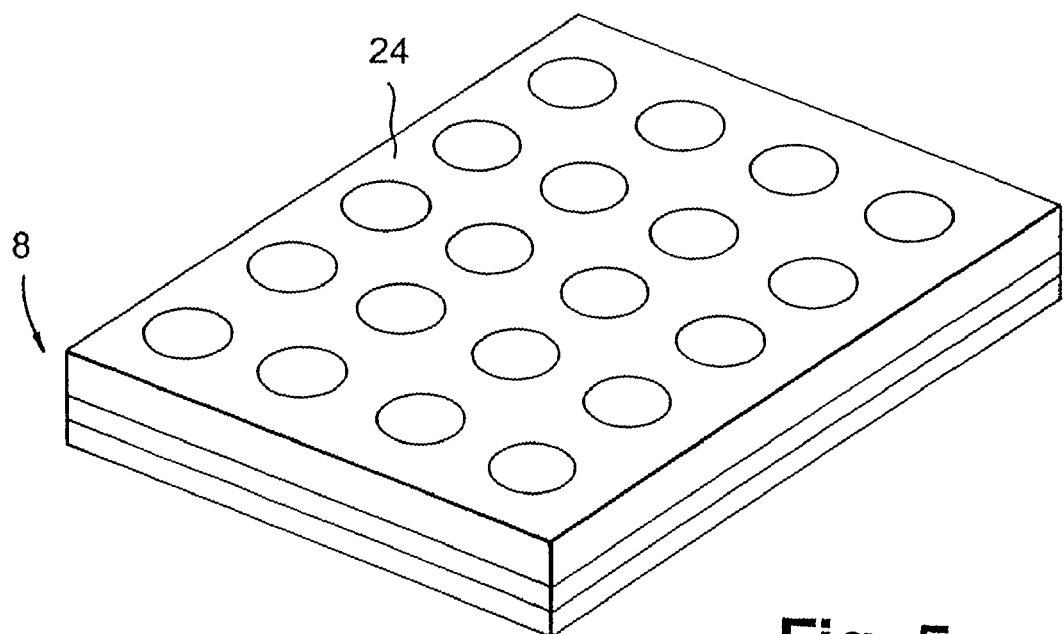
FIG. 5 is a cross-sectional view of another embodiment of the present invention. The absorbent core (8) is a multi-strata structure with 3 absorbent layers having pores useful for filtration (24).

The vapor-transmissive moisture barrier integral with the lower surface of the absorbent layer is formed by applying a hydrophobic material to a fibrous substrate for which it is desirable to impart a barrier to the transmission of liquids, but for which it is also desirable to permit the passage of vapors including water vapor. The hydrophobic moisture barrier comprises a hydrophobic material which at least partially coats the fibers of the lower surface of the absorbent layer. The hydrophobic material can be a natural or synthetic polymer, or a mixture thereof. The term "vapor-transmissive moisture barrier integral with the lower surface of an absorbent layer" as used herein means that the barrier material at least partially coats at least some of the individual fibers of the absorbent layer, as shown in FIGS. 5 and 7 of U.S. Patent Application Publication No. 2002-0013560-A1 (the '560 application), but that a continuous film is not formed. The absorbent layer remains vapor-transmissive since the pore structure between the untreated fibers, shown in FIGS. 4 and 6 of the '560 application, remains substantially open after treatment to form the barrier, as shown in FIGS. 5 and 7. With the moisture barrier in place on the substrate, the unitary absorbent core has a hydrohead of 30 mm or greater as measured by modified EDANA nonwoven repellency test 120.1-80, a strikethrough of 1.8 g or less as measured by the standard strikethrough test, an air permeability of 18 $m^3/min/m^2$ (60 $ft^3/min/ft^2$) or greater as measured by modified ASTM D 737-96, and a water vapor transmission rate (WVTR) of 500 $g/m^2/24$ hr or greater. In one embodiment, the unitary absorbent core has a hydrohead of 85 mm or greater, a strikethrough of 0.08 or less, and an air porosity of 235 CFM or greater.

In alternative embodiments which employ a synthetic carrier the moisture barrier may be vapor-nontransmissive or nearly so. In certain of these embodiments it is desirable to replace the hydrophobic material with a hydrophilic material.

Within the scope of this invention is a vapor-transmissive moisture barrier integral with the lower surface of an absorbent layer where the hydrophobic barrier material coats at least some of the individual fibers of the absorbent layer, and where a reticulated remnant of a barrier material emulsion extends from the surface region of the absorbent layer to form an outer reticulated foam barrier as shown in FIGS. 10 and 11 of the '560 application. In FIG. 10, the SEM photomicrograph at 80× shows several fibers intermingled with the reticulated remnant of the barrier material emulsion.

Hydrophobic materials suitable for use in this invention include a wide variety of materials known for water repellency, such as, for example, water insoluble thermoplastic organic materials including hydrocarbons and naturally occurring resins from petroleum, asphalt and coal tar, organic silicon compounds including polyorganosiloxanes, polysiloxanes containing halogens, especially fluorine, halohydrocarbons, especially polymers containing chlorine and fluorine, and various polymers in the form of natural or synthetic emulsions. Emulsion polymers suitable for use in this invention include lattices containing polymers, copolymers, as well as mixtures and blends of polymers and copolymers, containing in polymerized form one or more monomers of vinyl acetate, vinyl chloride, vinyl alcohol, acrylics, acrylates, acrylonitrile, ethylene, propylene, styrene, butadiene, isoprene, and various halogenated counterparts thereof.

In a preferred embodiment, the vapor-transmissive moisture barrier is formed by applying a hydrophobic polymeric latex emulsion to the lower surface of the absorbent layer. In at least one embodiment, it is desirable that a barrier is produced which has a contact angle for water on the film cast from an emulsion of about 80° or greater, as measured by the contact angle test (described below). Suitable hydrophobic polymeric emulsions include emulsions of both natural and synthetic polymers, including synthetic latexes. Several manufacturers supply such latex emulsions including Rohm and Haas, B. F. Goodrich, Air Products Polymers and Unichem Inc. A preferred latex emulsion is Unibond 0930 (Unichem Inc., Greenville, S.C.) which is an acrylic polymer. The emulsion can be applied by a variety of methods known in the art, including spray, brush, doctor blade, roller, and foam. Foam application is preferred in this aspect of the invention.

The preferred application process involves the injection of air into an emulsion to form bubbles and create a temporary foam, or froth. In this application process, the collapse of the froth and elimination of air bubbles during the process of drying and curing the emulsion occurs. Advantages of foam application are more uniform reagent distribution, ability to apply reagent at higher solids contents, and more control over reagent penetration into the substrate.

For the embodiment of this invention where the moisture barrier produced has a reticulated remnant of a barrier material emulsion extending from the lower surface region of the absorbent layer to form an outer reticulated foam barrier, it is preferable to use a foam that has greater stability than the easily collapsible foams used for moisture barrier formation where no outer reticulated foam barrier is produced. For a description of suitable conventional foaming procedures and foam stabilizers and foaming agents, reference is made to Mage, E. W., "Latex Foam Rubber," John Wiley and Sons, New York (1962) and Rogers, T. H, "Plastic Foams", Paper, Reg. Tech. Conf., Palisades Sect., Soc. Plastics Engrs., New York, November, 1964. Most common are the alkali metal, ammonia, and amine soaps of saturated or unsaturated acids having, for example, from about 12 to about 22 carbon atoms. Examples of suitable soaps include tallow soaps and coconut oil soaps, preferably the volatile amine or ammonia soaps, so that the volatile portion is vaporized from the foam. Other useful foaming-foam-stabilizing agents include lauryl sulfate-lauryl alcohol, lauryl sulfate-lauric acid, sodium lauryl sulfate, and other commonly used foamed stabilizers or foaming agents.

A preferred emulsion for the formation of the moisture barrier produced with a reticulated remnant of a barrier material emulsion extending from the lower surface region of the absorbent layer to form an outer reticulated foam barrier is Unibond 0938 from Unichem, which is an acrylic copolymer dispersed in a water base. Application by foam is preferred for Unibond 0938.

Unibond 0938 is engineered so that it does not collapse on the surface upon which it is foamed. After the Unibond 0938 foam is dried and cured, an elastic, reticulated structure, a reticulated remnant of the barrier material emulsion remains on the surface. See FIGS. 8-11 of the '560 application, which are scanning electron micrographs (SEMs) of treated and untreated surfaces.

Generally, whether the moisture barrier formed has a reticulated remnant of the barrier material emulsion is a consequence primarily of the stability of the foam, which is influenced by the nature of the emulsion polymer in the emulsion, whether a foam stabilizer is used and the process conditions during application. In practice this is easily controlled.

An alternative method of producing the barrier is the addition of powder to a surface of the material or core, which surface may have been roatated, and on an airlaid line the powder addtion may be before, after, or through one or more forming heads. After application of the latex emulsion to the surface of the absorbent layer, the emulsion is cured by removing water by drying or heat application. Optionally, crosslinking agents or other curing agents may be employed. Other additives may be included in the emulsion, such as biocides, water repellents, fillers and colorants. Whichever application technique is used, it is important that the latex emulsion be applied in a sufficient quantity to at least partially coat a majority of individual fibers in the surface region of the absorbent layer. As used herein, "surface region" refers to the fibers of the absorbent layer directly exposed to the surface and several layers of fibers below such outermost fibers to a depth of from about 0.01 mm to about 1.0 mm from the surface, and preferably from about 0.05 mm to about 0.8 mm from the surface. As used herein, "partially coat" refers to the average portion of the surface area of a specific fiber coated with emulsion. Preferably, the fibers are coated by at least enough emulsion to render the fibers hydrophobic.

At the same time, for some aspects, it is important that the amount of latex emulsion applied not be so great that a continuous layer or film of polymer is formed which would block the pores. A continuous layer is disadvantageous because of the adverse affect on water vapor permeability of the resultant structure. Alternatively, for applications where water vapor transmission is irrelevant, a nontransmissive barrier may be preferred.

The amount of emulsion necessary to provide coated fibers without forming a continuous film or layer depends upon the density of the absorbent layer, the type of fibers employed, the type and physical properties of the emulsion employed, the method of application and the method of curing the absorbent core.

Without wishing to be bound by theory, it is believed that application of at least a partial coating of surface fibers with latex emulsion provides a hydrophobic moisture barrier, but because a continuous film or layer is not present, the pores created by adjacent coated fibers permit transmission of water vapor through the barrier. Fabric water repellency and breathability have been studied for several decades (A. W. Adamson, Physical Chemistry of Surfaces, Second Edition, Wiley, 1967, Chapters VII and X). A nonwoven web of fibers can be modeled as a bundle of cylindrical pores (capillaries) of radius r. The fluid pressure required to penetrate the interfiber pores of a nonwoven web can be approximated from Laplace's equation for the penetration of a fluid into a tube:

$$P = (2O \cos O)/r$$

where:
P=pressure required to push fluid through the tube
γ=fluid surface tension
θ=advancing contact angle
r=pore radius This equation can be used to describe web wetting (θ<90°, P is positive) or web water repellency (θ>90°, P is negative). In the case of water repellency, the fluid will not wet the web unless a pressure of P is applied to push the fluid into the web. From the equation, barrier quality is predicted to be enhanced by increasing the contact angle with a water-repellent finish. In other words, the pores of the web should be rendered as hydrophobic as possible.

Apparent contact angles can be increased by surface roughness on the macroscale and microscale. Application of a waterproofing agent that causes microscopic pore surface roughness will lead to an increase in apparent contact angle, thus improving barrier quality.

From the equation, barrier quality is predicted to be enhanced by reducing the size of the interfiber pores. Ideally, the web should be as strong as possible. As pressure builds, weakness in the web will cause deformation, and deformation increases r, thus lowering pressure P. Web strength can be enhanced by, for example, increasing the amount of binder in the web.

The size of interfiber pores in a fibrous web is determined by the fiber size and the density or extent of compaction of the web. Increasing the density of the web can reduce the size of interfiber pores, or using smaller diameter fibers at the same density can reduce them. Smaller fibers pack together more efficiently in a densified web, resulting in smaller interfiber pores. From the equation, using smaller fibers serves to decrease r, thus raising pressure P.

Filler material can be added to the hydrophobic emulsion to reduce the size of interfiber pores. From the equation, the addition of filler serves to decrease r, thus raising pressure P. The addition of filler to the treatment of the present invention increases barrier performance by partially blocking the pores of the nonwoven web, resulting in improved barrier quality. Filler suitable for use in the practice of this invention include calcium carbonate, bicarbonates, especially sodium bicarbonate, various kinds of clay (bentonite and kaolin), silica, alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, mica, carbon, calcium oxide, magnesium oxide, aluminum hydroxide, pulp powder, wood powder, cellulose derivative, polymer particles, chitin and chitin derivatives.

From the equation, barrier quality is predicted to be directly proportional to the fluid surface tension. The barrier treatment should be as durable as possible. Any additives in the barrier treatment that will dissolve in the fluid will likely lower its surface tension, thus lowering pressure P.

The contact angle test may be used to determine the contact angle of water on films cast from materials used to make the barrier, and in particular, water-based latex emulsions.

The emulsion is diluted with water to form a solution containing 10% solids. The solution is poured onto a borosilicate microscope slide to form a visible coat. The coated slide is set aside to dry overnight at ambient temperature and humidity. The coated slide is cured in a forced-air oven at 140° C. for five minutes. The advancing contact angle is measured using an FTÅ 200 Dynamic Contact Angle and Surface Tension Analyzer (First Ten Angstroms, Portsmouth, Va.) with reverse-osmosis treated water injected with a 27-gauge needle. The FTÅ 200 measures the advancing contact angle by the drop shape method.

Contact angles were measured for a naked slide (a "blank"), for Unibond 0930 and Unibond 0938 (both acrylic latex emulsions from Unichem Inc., Greenville, S.C.) and for Airflex 192 (ethylene-vinyl acetate latex emulsion, Air Products Polymers, Allentown, Pa.).

Water prefers to wet some surfaces and prefers to bead on others. A surface can be classified as hydrophilic, with a water contact angle less than 90°, or hydrophobic, with a water contact angle greater than 90°, based on the shape that a drop of water assumes when placed on that surface.

TABLE 1

Contact angle measurements for films cast from latex emulsions

| Material | Contact angle |
|---|---|
| Naked glass slide (blank) | 47.5 |
| Unibond 0930 | 95.9 |
| Unibond 0938 | 105.8 |
| Airflex 192 | 44.4 |

Table 1 shows results from contact angle measurements for films cast with Unibond 0930 and Unibond 0938 (Unichem Inc., Greenville, S.C.) and Airflex 192 (Air Products Polymers, Allentown, Pa.) latex emulsions. Table B-1 shows that Unibond 0930 and Unibond 0938 were both successful in rendering the surface of the microscope slide hydrophobic with a contact angle greater than 90°. Table B-1 shows that Airflex 192 was not successful in rendering the slide hydrophobic since it produced a contact angle less than 90°.

Any material capable of delivering a contact angle greater than 90° in this test would be a candidate for possible use in the present invention, provided that the material can be applied to a surface of an absorbent layer to render it hydrophobic without creating a continuous film which does not permit the passage of vapor. The hydrophobic emulsions Unibond 0930 and Unibond 0938 (Unichem Inc., Greenville, S.C.) are preferred latex emulsions for use in the practice of the present invention.

In an alternative process for the preparation of a unitary absorbent core comprising a fibrous absorbent layer having an upper fluid receiving surface and a lower surface with a hydrophobic vapor-transmissive moisture barrier integral with the lower surface of the absorbent layer, a hydrophobic material may be dissolved in a suitable solvent and contacted with the lower surface of the absorbent layer followed by causing the solvent to be removed. The solution may be applied to the lower surface of the absorbent layer by spraying, or the lower surface of the absorbent layer may be brought into contact with the solution by brief partial immersion, followed by draining and evaporation of the solvent.

In alternative embodiments of this invention, the fibrous absorbent layer of the absorbent core may be replaced wholly or in part by partially fibrous or nonfibrous structures capable of acceptable performance in an absorbent core, preferably a unitary absorbent core. Suitable partially fibrous or nonfibrous structures include spunbond webs, meltblown webs, coform webs, such as meltblown mixed with cellulose fibers, airlaid webs, and bonded carded webs, differential basis weight nonwoven webs and high internal phase emulsion (HIPE) and other foam structures.

In other embodiments, the hydrophobic vapor-transmissive moisture barrier of this invention may be integral with a surface of thermoset or thermoplastic cellular or noncellular material, which may be present in a composite of synthetic or synthetic and natural materials. Various sythetic nonwoven materials can be used as a carrier in the production of cores, especially by airlaid processes. The basis weight of these synthetic carriers desirably is from about 8 gsm (grams per square meter) to about 100 gsm, preferably from about 9 to about 60 gsm, more preferably from about 13.5 to about 22 gsm. Suitable nonwoven carrier materials are meltblown, spunbond, carded, needlepunched, garnetted, resin bonded, thermal bonded, and point bonded materials produced from, for example polyethylene, polypropylene, polyesterthphalate (PET), nylon 6, nylon 6,6,polylactic acid, polyvinyl alcohol. A preferred group of carrier materials contain at least one meltblown element. The presence of a meltblown element in the carrier in conjuction with the hydrophobic vapor-transmissive moisture barrier integral with carrier is especially important for realization of superior barrier properties. A preferred carrier material is a spunbond/meltblown/spunbond nonwoven with a basis weight of from about 10 to about 25 gsm. It is desirable for the meltblown element to be at least about 1 gsm and preferably from about 2 gsm to about 12 gsm, more preferably from about 2.5 to about 9 gsm, still more preferably from about 3 to about 7 gsm and still more desirably from about 4 to about 5 gsm. In other embodiments involving the use of synthetic carriers, a second hydrophobic vapor-transmissive moisture barrier integral with the uppermost fibrous layer may be used in the absorbent core. The properties of the two moisture barriers, such as, for example, the basis weight of the hydrophobic material, and even the hydrophobicity itself, may be varied so that the core produced has two outer surfaces with different properties.

Breathable fibrous materials and unitary absorbent cores of this invention desirably have a hydrohead as measured by modified EDANA nonwoven repellency test 120.1-80 of 30 mm or more, preferably of 50 mm or more, more preferably of 70 mm or more, even more preferably of 90 mm or more, still more preferably of 200 mm or more.

Breathable fibrous materials and unitary absorbent cores of this invention desirably have a strikethrough as measured by the standard strikethrough test of 1.8 g or less, preferably of 1.2 g or less, more preferably of 0.7 g or less, even more preferably of 0.1 or less and still more preferably of 0.02 g or less.

Breathable fibrous materials and unitary absorbent cores of this aspect of the invention desirably have an air permeability as measured by modified ASTM D 737-96 of from about 3 to about 7 $m^3/min/m^2$ (11-22 $ft^3/min/ft^2$), and for cores to be used for filtration, preferably no greater than about 10 $m^3/min/m^2$ (33 $ft^3/min/ft^2$). In other embodiments, the air permeability may be very low, approaching zero.

Breathable fibrous materials and unitary absorbent cores of this invention desirably have water vapor transmission rate as measured by the water vapor transmission rate (WVTR) test which is a modification of ASTM E 96-95 of 500 $g/m^2/24$ hr or greater, preferably of 1000 $g/m^2/24$ hr or greater, more preferably of 2000 $g/m^2/24$ hr or greater, and even more preferably of 3000 $g/m^2/24$ hr or greater.

Breathable fibrous materials and unitary absorbent cores of this invention having a WVTR of 500 $g/m^2/24$ hr or greater desirably have barrier effectiveness values of 10 mm or greater, more desirably of 30 mm or greater, preferably of 50 mm or greater, more preferably of 75 mm or greater, still more preferably of 100 mm or greater and even more preferably of 230 mm or greater.

In several embodiments, the breathable fibrous materials and unitary absorbent cores of this invention provide structures which are useful for food and household applications. Within the scope of this invention are embodiments where these structures are used in combination with one or more plastic structural elements know in the art for food storage, transportation, display or presentation, such as, for example, foam trays for meat, poultry or fish.

In some embodiments, the material or core would be glued, for example, with hot melt adhesive, in a tray. Various configurations are possible, such as, for example, glued in the tray with the barrier facing up, glued in the tray with the barrier facing down, sealed in a pouch, edge sealed or used in various laminates with other layering materials. A preferred method of use is to simply place a core in a tray with the barrier facing up.

In several embodiments, the breathable fibrous materials and unitary absorbent cores of this invention provide structures which are useful for filtration. Within the scope of this aspect of the invention are embodiments where these structures are used in combination with one or more structural elements know in the filtration art for appropriate containment of the breathable fibrous material or unitary absorbent core so that it may be used in a filtration process.

Test Methods

The following test methods were used to measure water vapor transmission rate, air permeability, strikethrough and hydrostatic head for the structures prepared in the following examples.

Water Vapor Transmission Rate

The method is used to determine the water vapor transmission rate (WVTR) through airlaid handsheets and is a modification of ASTM E 96-95.

Apparatus for this test includes a vapometer cup (#68-1, Thwing-Albert Instrument Co., Philadelphia, Pa.) and a forced-air oven capable of maintaining a temperature of 38° C. plus or minus 1° C. (Lindberg/Blue M, Lindberg/Blue M Co., Asheville, N.C., or equivalent). A circular sample 7.6 cm (three inches) in diameter is cut from a handsheet. One hundred milliliters of deionized water is placed into the vapometer cup. The test material is placed over the cup opening. The screw-on flange is tightened over the test material, leaving an exposed sample area of 33.17 square centimeters. The initial weight of the cup is recorded. The cup is placed on a tray and set in the forced-air oven for 24 hours at 38° C. After 24 hours, the cup is removed from the oven and reweighed to determine total water loss. WVTR is calculated as follows:

$$\text{WVTR } (g/m^2/24 \text{ hours}) = [\text{total water loss over 24 hours } (g) \times 301.5]$$

The report for each test includes the average WVTR (n=3) for treated samples compared to the average WVTR (n=3) for the untreated control material. Note that the relative humidity within the oven is not specifically controlled in this test.

Air Permeability

This method is a modification of the standard air permeability test for woven and nonwoven fabrics, ASTM D 737-96. Air permeability through the treated samples is compared with air permeability through untreated samples to give relative permeability effectiveness.

Air permeability of absorbent core handsheets is determined using an air permeability tester (Model 9025, modified with digital "A" and "B" gauges, U.S. Testing Co., Inc., 1415 Park Ave., Hoboken, N.J. 07030). Specifically, three handsheets per experimental sample (n=3) are tested using the air permeability tester. For each handsheet, a pressure drop of 1.3 cm (0.5 in.) of water is established across the handsheet. Airflow though the sheet is measured by the pressure drop across an orifice indicated on a vertical manometer. The average manometer reading is converted to air permeability using conversion tables provided by the manufacturer of the air permeability tester. Air permeability is reported as airflow in $m^3/min/m^2$ and cubic feet per minute per square foot ($ft^3/min/ft^2$).

Strikethrough

This test is used to measure the resistance of sample materials to penetration by synthetic menses.

Samples are cut into 10.3 cm×10.3 cm (4 in.×4 in.) squares. Each sample is placed onto a 10.3 cm×10.3 cm (4 in.×4 in.) Plexiglas bottom plate with the treated side facing down. The sample is covered with a 3.2 mm (0.125 in.) thick, 10.3 cm×10.3 cm (4 in.×4 in.) Plexiglas top plate with a 3.2 cm (1.25-in.) diameter hole cut in its center. A 5 ml insult of synthetic menses (room temperature) is introduced through the hole in the top plate. After waiting for 20 minutes, a tared stack of 10 Whatman #3 filter papers, 110 mm circles, (Whatman International Ltd., England) is placed on the bottom plate beneath the sample. A 2500 g weight is placed on the Plexiglas top plate and is allowed to stand for 2 minutes. After 2 minutes, the filter papers are removed and weighed. Strikethrough is calculated as follows:

$$\text{Strikethrough } (g) = \text{Wet filter paper weight } (g) - \text{Tare filter paper weight } (g)$$

This test is usually run in triplicate (n=3) and the average value is reported in the unit of grams.

Hydrostatic Head

Hydrostatic head (hydrohead) is measured by using a modified version of the EDANA nonwoven repellency test 120.1-80. This EDANA test is based on test method ISO 811:1981-EN 20811:1992. The EDANA method is modified by using a testing diameter of 60 mm; a cylinder length of 100 mm; a manometer diameter of 10 mm (internal); a dosing pump equipped with a T-valve for rapid cylinder filling; and an aqueous test solution of 10% (w/v) calcium chloride (General Chemical Co., Parsippany, N.J.). The calcium chloride is used to inhibit swelling of any SAP particles in the test sample, which might otherwise interfere with web integrity during the test. This test is usually run in triplicate (n=3) and the average result is reported in the unit of millimeters of hydrohead.

EXAMPLES

The following examples are presented to provide a more detailed understanding of the invention. The specific materials and parameters are exemplary and are not intended to limit the scope of the invention.

Layer 1 contains a mixture of fibers and binder, preferably a cellulosic pulp and binder mixture, consisting of some combination of pulp, bonding fiber, optional superabsorbent material and emulsion polymer binder. The pulp can be any of a number of cellulose fluff pulps. A preferred fluff pulp is FOLEY FLUFFS® from Buckeye Technologies Inc. which was used in the Examples hereinbelow. The bonding fiber was KoSa F55 bicomponent fiber consisting of a polyester core and a polyethylene sheath. The emulsion polymer binder was an ethyl vinyl acetate copolymer that sells under the trade name AirFlex 192 by Air Products. The superabsorbent material may be in the form of granules, fibers, powder, flakes, with granules and fibers being preferred. A preferred superabsorbent material is superabsorbent fiber, Fiberdri™ 1261, from Camelot Technologies, which was used in the Examples hereinbelow. Fiberdri™ has a denier per filament from about 28 to about 32, a moisture content from about 3 to about 7 weight percent, a pH of from about 5 to about 7.5. Another preferred superabsorbent material is a superabsorbent fiber, such as, for example, OASIS Type 101 which is cut to a length of 6 mm, has a decitex of 10 and a diameter of from about 25 to about 35 microns. In an alternative embodiment, this layer may contain fibers and binder with very little or no superabsorbent material.

Layer 2 contains a mixture of pulp, optional superabsorbent material and bonding fiber. This mixture of pulp and bonding fiber can be the same or different from the mixture in Layer 1. In this case, the same components, Foley Fluffs®, Fiberdri 1261 and KoSa F55, were used.

In one embodiment where the materials of Layers 1 and 2 are identical and where these strata are produced in successive unit operations by separate heads in a continuous airlaid process, the layers merge into a single stratum with no distinguishable feature to indicate where the material laid down by one head ends and the material laid down by another head begins. Other embodiments of this type may be produced where additional layers, which merge into a single stratum, are added to the structure in additional successive unit operations by separate heads in a continuous airlaid process.

Layer 3 contains a carrier, generally a synthetic carrier, such as, for example, a spunbond/meltblown/spunbond/ (SMS) polypropylene carrier or a spunbond propylene carrier. A preferred carrier is a 17 gsm spunbond/meltblown/ spunbond/ (SMS) polypropylene carrier provided by First Quality Nonwovens which was used in the Examples hereinbelow. This layer optionally contains an emulsion polymer binder, such as, for example, a vinyl acetate copolymer such as AirFlex 192 by Air Products.

Layer 4: This layer can consist of various emulsion polymer binders that are hydrophobic.

Using the above materials, structures were made that require columns of water of heights from 86 mm to 245 mm before strikethrough. This resistance, called hydrostatic head, is measured using a modified version of test method ISO 811:1981—EN 20811:1992. The reported method is modified by employing a testing diameter of 60 mm; a cylinder length of 100 mm, a manometer diameter of 10 mm (internal), a dosing pump equipped with a T-valve for rapid cylinder filling, and employing a 10% w/v in water solution of calcium chloride (anhydrous, analytical reagent grade). The calcium chloride is employed to inhibit swelling of any superabsorbent in the test sample, which might otherwise interfere with web integrity during the test. The tests for food applications were tested with the barrier facing the 10% w/v aqueous calcium chloride solution.

The materials were also tested for air permeability using a modification of the standard test for nonwoven fabrics, ASTM 737-96. Air permeability through treated samples is compared with air permeability through untreated samples to give relative permeability effectiveness. The air permeability for these samples, reported in units of cubic feet per minute per square foot, ranges from 11 to 22.

Experimental

Prior to starting the experimental runs:

The three hammermills in the pilot plant were loaded with Foley Fluffs®. KoSa F55 bicomponent fiber (polyester core/ polyethylene sheath) was also loaded into two LaRoche towers. Camelot Fiberdri 1261 was loaded into one LaRoche tower. This LaRoche tower was then set to feed a blend of the Camelot Fiber and the KoSa fiber. The blend was 57% Camelot fiber and 43% KoSa fiber. 17 gsm polypropylene SMS by Frist Quality Nonwovens was loaded onto the unwind stand at the head of the airlaid machine. The drying and curing ovens were set to 140° C. AirFlex 192 from Air Products was diluted with water to 11% solids. Aerosol OT was added to enhance the spray and foam characteristics. If desired, the SMS carrier sheet may be perforated.

Preparation of Base Webs:

The SMS carrier sheet was unrolled onto the moving forming wire. As the carrier sheet traveled through the airlaid machine, a blend of 83.5% Foley Fluffs® from the hammermills and 16.5% Kosa F55 bicomponent fiber from the LaRoche tower was fed through one forming head and laid on top of the carrier. The sheet was then sprayed with emulsion binder AirFlex 192 on the fluff side. The material was then conveyed through a 30 meter long through-air oven to dry the binder spray and begin to melt the polypropylene sheath of the bicomponent fiber. When the material emerged from the oven, AirFlex 192 was foamed onto the carrier side of the structure. The web was then passed through a drum dryer to dry the foamed emulsion binder and to complete the curing of the binders. The material was then collected in a roll with a minimal amount of compaction. For additional samples, the speed of the line was adjusted until the correct amount of pulp and bicomponent fiber were being deposited onto the moving carrier. Seven samples of varying weights per square meter (basis weights) were collected in roll form.

On a second day, the SMS carrier sheet was unrolled onto the moving forming wire. As the carrier sheet traveled through the airlaid machine, a blend of 53.5% Foley Fluffs® from the hammermills and 46.5% of a bicomponent/superabsorbent blend (42.9 % Kosa F55 bicomponent fiber and 57.1% Camelot Fiberdri 1261) from the LaRoche tower was fed through one forming head and laid on top of the carrier. The sheet was then sprayed with emulsion binder AirFlex 192 on the fluff side. The material was then conveyed through a 30 meter long through-air oven to dry the binder spray and begin to melt the polypropylene sheath of the bicomponent fiber. When the material emerged from the oven, AirFlex 192 was foamed onto the carrier side of the structure. The web was then passed through a drum dryer to dry the foamed emulsion binder and to complete the curing of the binders. The material was then collected in a roll with a minimal amount of compaction. For additional samples, the speed of the line was adjusted until the correct amount of pulp, superabsorbent fiber and bicomponent fiber were being deposited onto the moving carrier. Five samples of varying weights per square meter (basis weights) were collected in roll form.

Barrier Treatment:

A hydrophobic emulsion barrier was diluted with water to 20% solids. One of the twelve rolls of material described above was unrolled and passed through the airlaid machine with the carrier facing up. No fibers or powders were being fed through or between the forming heads of the line. The spray system was used to deliver the hydrophobic emulsion solution onto the carrier surface in a uniform coating. The material was then passed through an oven to dry and cure the hydrophobic emulsion. The same procedure and same treatment level was used for two of the materials containing superabsorbent fiber and for three of the materials without superabsorbent fiber.

Testing:

Samples of each of the treated rolls were cut into 4 inch by 4 inch squares. The squares were then tested for hydrostatic head. Additional samples were also cut for Frazier air permeability testing.

For each of the five pads using the 17 gsm carrier from First Quality Nonwovens, the hydrohead and Frazier Air Porosity were measured. Example 3A and 3D were also tested and shown to have water vapor transmission rates (WVTR) of >2000 $g/m^2/24hr$.

TABLE 3

Data for Pilot Samples Made with SMS Carrier and Hydrophobic Barrier

| Example | Basis Weight, gsm | Density, g/cc | HH, mm | Frazier, cfm |
|---------|-------------------|---------------|--------|--------------|
| 3A | 302.4 | 0.067 | 221 | 22.1 |
| 3B | 208.9 | 0.057 | 186 | 11.8 |

TABLE 3-continued

Data for Pilot Samples Made with SMS Carrier and Hydrophobic Barrier

| Example | Basis Weight, gsm | Density, g/cc | HH, mm | Frazier, cfm |
|---|---|---|---|---|
| 3C | 184.2 | 0.050 | 141 | 18.8 |
| 3D | 308.0 | 0.085 | 197 | 16.7 |
| 3E | 247.6 | 0.096 | 95 | 14.6 |

Work has been done comparing different carrier sheets, made from olefin polymers, in combination with a hydrophobic polymer emulsion. There is distinct difference in barrier effectiveness when the carrier is changed from spunbond polypropylene to polypropylene that is formed in layers of spunbond, meltblown and spunbond (SMS).

Example 1

Comparison of Spunbond Polypropylene to SMS Polypropylene Carriers

Sample SMS core: The bottom layer of the core consisted of an SMS polypropylene carrier (17 gsm SMS, First Quality Nonwovens, Inc., Hazelton, Pa.) on top of which was formed 50 gsm fluff pulp (Foley Fluffs®, Buckeye Technologies, Inc., Memphis, Tenn.), 7 gsm bicomponent binder fiber (Type AL-Adhesion-C, 1.55 dpf×4 mm, FiberVisions, Macon, Ga.) and 6 gsm of latex adhesive (Airflex 124 ethylene-vinyl acetate emulsion, Air Products Polymers, Allentown, Pa.). The second layer consisted of 48 gsm fluff pulp (Foley Fluffs®, Buckeye Technologies, Inc., Memphis, Tenn.), 9 gsm bicomponent binder fiber (Type AL-Adhesion-C, 1.55 dpf×4 mm, FiberVisions, Macon, Ga.) and 3 gsm of latex adhesive (Airflex 124 ethylene-vinyl acetate emulsion, Air Products Polymers, Allentown, Pa.) sprayed on top for dust control. The absorbent core had an overall basis weight of 140 gsm and a density of 0.1 g/cc. Sample Spunbond core: The core consisted of an spunbond polypropylene carrier (20 gsm hydrophilic spunbond polypropylene, Mogul, Turkey) on top of which was formed 54 gsm fluff pulp (Foley Fluffs®, Buckeye Technologies, Inc., Memphis, Tenn.), 18.9 gsm bicomponent binder fiber (Type 255, 2.8 dpf×4 mm, KoSa, Salisbury, N.C.) and 17.1 gsm superabsorbent fiber (Type 101, Oasis, Technical Absorbents, London, UK). The absorbent core had an overall basis weight of 110 gsm and a density of 0.1 g/cc.

The carrier side of handsheets of each of the two cores were treated with varying amounts of hydrophobic barrier (AP12755-95-1, AirProducts, Allentown, Pa.) as shown in the table. The resulting handsheets were tested for hydrostatic head and the results are shown in Table 1.

The data shows that the SMS carrier gives better hydrohead values at all barrier levels.

TABLE 1

Test Results for Comparison of SMS and Spunbond Polypropylene Carriers

| Example 1 | Barrier, gsm | Hydrohead, mm |
|---|---|---|
| SMS Core | 1 | 81 |
|  | 5.5 | 101 |
|  | 9.4 | 132 |
|  | 17 | 200 |

TABLE 1-continued

Test Results for Comparison of SMS and Spunbond Polypropylene Carriers

| Example 1 | Barrier, gsm | Hydrohead, mm |
|---|---|---|
| Spunbond | 2.5 | 45 |
| Core | 5.2 | 50 |
|  | 11 | 50 |
|  | 40 | 50 |

Example 2

Comparison of Different SMS Carriers

Four pads were made in the lab using different carriers. Pads consisting of 237.8 gsm fluff pulp (Foley Fluffs®, Buckeye Technologies, Inc., Memphis, Tenn.), 47.1 gsm of bicomponent binder fiber (Type F55, 2.8 dpf×6 mm, KoSa, Salisbury, N.C.) and 15.3 gsm of latex adhesive (Airflex 192 ethylene-vinyl acetate emulsion, Air Products Polymers, Allentown, Pa.) were formed on top of a carrier. The carriers used were polypropylene SMS materials as shown in Table 2. After formation, the carrier side of the pads were treated with 15 gsm of hydrophobic binder (an ethylene-vinyl acetate emulsion from Air Products, Allentown, Pa.). The resulting hydrostatic heads varied widely.

Figure 1:
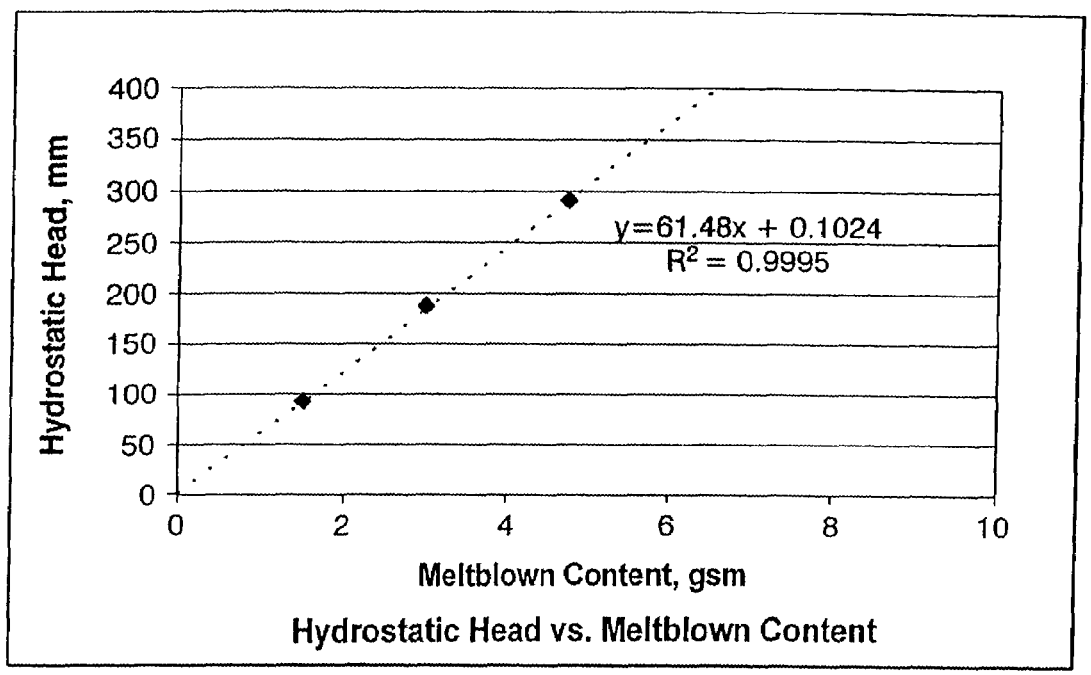
FIG. 1 is a graph depicting hydrostatic head versus melt-blown content of SMS carriers.
Figure 2:
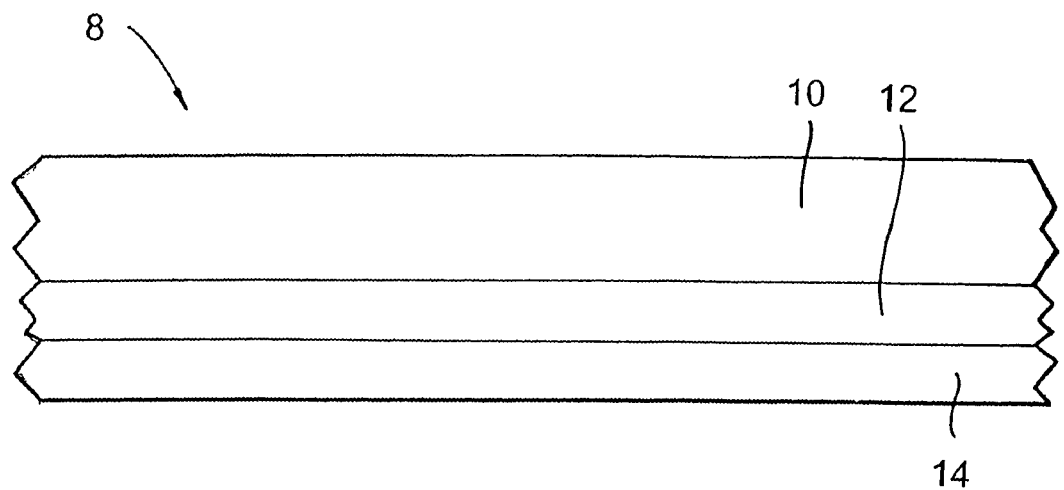
FIG. 2 is a cross-sectional view of one embodiment of an absorbent core (8) of the present invention. The absorbent core (8) of the present invention includes a fibrous, absorbent layer (10) having an upper fluid receiving surface and a lower surface, and a vapor-transmissive moisture barrier integral with the lower surface of the absorbent layer: a second fibrous absorbent layer (12); and a third absorbent layer (14).

When the hydrostatic head results are graphed versus the available meltblown contents of the carriers as in (FIG. 1), there is a linear relationship shown. The hydrostatic head value is directly related to the meltblown content of the carrier sheet. Within the family of SMS carriers, the use of carriers with high meltblown content gives the best hydrostatic head values.

TABLE 2

Comparison of SMS Carrier Materials

| Carrier Producer | Carrier Basis Weight, gsm | Hydrohead, mm | Meltblown Content, gsm |
|---|---|---|---|
| Avgol, Holon, Israel | 13.5 | 91 | 1.50 |
| Avgol, Holon, Israel | 17.0 | 187 | 3.00 |
| FQN, Hazelton, PA | 17.0 | 267 | Not available |
| BBA, Washougal, WA | 23.7 | 291 | 4.75 |

Example 3

A pad was made according to the present invention using a 17.0 gsm FQN SMS carrier sheet on which was applied two successive airlaid layers of a blend of Foley Fluff (55 gsm) and Fibervisions 814ALAD bico fiber (10 gsm). A third layer was then applied including a blend of Foley fluff (55 gsm) and Fibervisions 814ALAD bico fiber (9 gsm). The airlaid material was sprayed on the upper airlaid surface with 3.0 gsm of Airflex 192 and on the exposed surface of the SMS carrier with 11.0 gsm of a proprietary ethylene vinyl acetate copolymer spray as a hydrophobic moisture barrier. The completed pad had a total basis weight of 225 gsm. After application of the sprays, the material was oven dried and cured. The finished pad had an absorbency of 14 g/g and a hydrohead of 70 mm.

Example 4

A pad was made as in Example 3, except the basis weight of each layer included 79 gms of Foley Fluff and 14 gsm of Fibervisions 814ALAD bico fiber. The total basis weight of the pad was 310 gsm. The finished pad had an absorbency of 14 g/g and a hydrohead of 70 mm.

Example 5

A pad was made as in Example 4, except the proprietary EVA spray was substituted with an EVA spray from Airflex designated EP1188. The basis weight of the EP1188 was 5.0 gsm. The finished pad had a basis weight of 304 gsm. The finished pad had an absorbency of 14 g/g and a hydrohead of 70 mm.

Example 6

A pad was made as in Example 3, except the proprietary EVA spray was substituted with an EVA spray from Airflex designated EP1188. The basis weight of the EP1188 was 5.0 gsm. The finished pad had a basis weight of 219 gsm. The finished pad had an absorbency of 14 g/g and a hydrohead of 70 mm.

What claimed is:

1. A unitary absorbent core comprising:
    I) a first fibrous absorbent layer comprising:
        a) from about 15 to about 95 percent by weight natural fibers, synthetic fibers or a mixture thereof,
        b) from 0 to about 80 percent by weight superabsorbent material; and
        c) from about 5 to about 30 percent by weight of a binder which is a synthetic binder fiber or powder, a hydrophilic emulsion polymer binder or a mixture thereof, and,
    the fibrous absorbent layer having an upper surface and a lower surface, the lower surface in contact, optionally coextensively in contact, with
    II) an upper surface of a spunbond-meltblown-spunbond nonwoven synthetic carrier having a basis weight of from about 9 gsm to about 30 gsm, which has a lower surface integral with
    III) a first vapor-transmissive moisture barrier, wherein the moisture barrier is hydrophobic or hydrophilic;
    wherein the unitary absorbent core has a basis weight of about 45 gsm or greater and, wherein the unitary absorbent core has an air permeability of from about 3 to about 7 m$^3$/min/m$^2$ (11-22 ft$^3$/min/ft$^2$).

2. The unitary absorbent core of claim 1, wherein the core further comprises in contact, optionally, coextensively in contact, with the upper surface of the first fibrous absorbent layer
    IV) a second fibrous absorbent layer comprising
        a) natural fibers, synthetic fibers or a mixture thereof, and
        b) a binder which is a synthetic binder fiber or powder, a hydrophilic emulsion polymer binder or a mixture thereof.

3. The unitary absorbent core of claim 2, wherein the first, second or first and second fibrous absorbent layers further comprise superabsorbent material.

4. The unitary absorbent core of claim 3, wherein the core has an absorbent capacity of from about 10 grams/gram to about 15 grams/gram.

5. The unitary absorbent core of claim 1, wherein the upper surface of the first or second fibrous layer which is uppermost in the core is integral with a second moisture barrier, which may be the same as or different from the first moisture barrier.

6. The unitary absorbent core of claim 1, wherein the basis weight of the core is from about 50 to about 1000 gsm.

7. The unitary absorbent core of claim 6, wherein the basis weight of the core is from about 75 to about 350 gsm.

8. A unitary absorbent core comprising:
    I) a first fibrous absorbent layer comprising:
        a) from about 15 to about 95 percent by weight natural fibers, synthetic fibers or a mixture thereof,
        b) from 0 to about 80 percent by weight superabsorbent material; and
        c) from about 5 to about 30 percent by weight of a binder which is a synthetic binder fiber or powder, a hydrophilic emulsion polymer binder or a mixture thereof, and,
    the fibrous absorbent layer having an upper surface and a lower surface, the lower surface in contact, optionally coextensively in contact, with
    II) an upper surface of a natural or synthetic carrier which has a lower surface integral with
    III) a first vapor-nontransmissive moisture barrier, wherein the moisture barrier is hydrophobic or hydrophilic and wherein the unitary absorbent core has a basis weight of about 45 gsm or greater.

9. The unitary absorbent core of claim 8, wherein the core further comprises in contact, optionally, coextensively in contact, with the upper surface of the first fibrous absorbent layer
    IV) a second fibrous absorbent layer comprising
        a) natural fibers, synthetic fibers or a mixture thereof, and
        b) a binder which is a synthetic binder fiber or powder, a hydrophilic emulsion polymer binder or a mixture thereof 10. A receptacle for containing a food product which tends to exude fluids comprising:
    (A) a tray for holding a food product; and
    (B) positioned in the tray, a unitary absorbent core having a basis weight of 45 gsm or greater comprising:
        I) a first fibrous absorbent layer comprising:
            a) from about 15 to about 95 percent by weight natural fibers, synthetic fibers or a mixture thereof,
            b) from 0 to about 80 percent by weight superabsorbent material; and
            c) from about 5 to about 30 percent by weight of a binder which is a synthetic binder fiber or powder, a hydrophilic emulsion polymer binder or a mixture thereof, and,
        the fibrous absorbent layer having an upper surface and a lower surface, the lower surface in contact, optionally coextensively in contact, with
        II) an upper surface of a synthetic carrier which has a lower surface integral with
        III) a first vapor-transmissive or vapor-nontransmissive moisture barrier, wherein the moisture barrier is hydrophobic or hydrophilic.

11. The receptacle of claim 10, wherein the first vapor-transmissive or vapor-nontransmissive moisture barrier is vapor-nontransmissive.

12. The receptacle of claim 10, wherein the first vapor-transmissive or vapor-nontransmissive moisture barrier is vapor-transmissive and the unitary absorbent core has an air permeability of from about 3 to about 7 m$^3$/min/m$^2$ (11-22 ft$^3$/min/ft$^2$).

13. The receptacle of claim 10, wherein the synthetic carrier is an SMS nonwoven having a basis weight of from about 9 gsm to about 30 gsm.

14. The receptacle of claim 10, wherein the core further comprises in contact, optionally, coextensively in contact, with the upper surface of the first fibrous absorbent layer
   IV) a second fibrous absorbent layer comprising
      a) natural fibers, synthetic fibers or a mixture thereof, and
      b) a binder which is a synthetic binder fiber or powder, a hydrophilic emulsion polymer binder or a mixture thereof.

15. The receptacle of claim 10, wherein the first, second or first and second fibrous absorbent layers further comprise superabsorbent material.

16. The receptacle of claim 15, wherein the core has an absorbent capacity of from about 10 grams/gram to about 15 grams/gram.

17. A filter element comprising:
   (A) a support matrix, and
   (B) an absorbent core having a basis weight of 45 gsm or greater comprising:
      I) a first fibrous absorbent layer comprising
         a) natural fibers, synthetic fibers or a mixture thereof,
         b) a binder which is a synthetic binder fiber or powder, a hydrophilic emulsion polymer binder or a mixture thereof,
      the fibrous absorbent layer having an upper surface and a lower surface, the lower surface in contact, optionally coextensively in contact, with
      II) an upper surface of a spunbond-meltblown-spunbond nonwoven synthetic carrier having 2 a basis weight of from about 9 gsm to about 30 gsm, which has a lower surface integral with
      III) a first vapor-transmissive moisture barrier, wherein the moisture barrier is hydrophobic or hydrophilic;
   wherein the absorbent core has an air permeability of from about 3 to about 7 m$^3$/min/m$^2$ (11-22 ft$^3$/min/ft$^2$).

18. The filter element of claim 17, wherein the core further comprises in contact, optionally, coextensively in contact, with the upper surface of the first fibrous absorbent layer
   IV) a second fibrous absorbent layer comprising
      a) natural fibers, synthetic fibers or a mixture thereof, and
      b) a binder which is a synthetic binder fiber or powder, a hydrophilic emulsion polymer binder or a mixture thereof.

19. The filter element of claim 17, wherein the core has an absorbent capacity of from about 10 grams/gram to about 15 grams/gram.

20. The filter element of claim 17, wherein the core contains superabsorbent material and the core has an absorbent capacity of from about 20 grams/gram to about 110 grams/gram.

21. The unitary absorbent core of claim 17, wherein the core contains superabsorbent material and the core has an absorbent capacity of from about 20 grams/gram to about 50 grams/gram.

* * * * *